US006860224B2

(12) United States Patent
Snider

(10) Patent No.: US 6,860,224 B2
(45) Date of Patent: Mar. 1, 2005

(54) INDICATOR KNOB WITH OVERMOLDED APPLIQUE

(75) Inventor: Chris R. Snider, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 7 days.

(21) Appl. No.: 10/068,754

(22) Filed: Feb. 8, 2002

(65) Prior Publication Data

US 2003/0150371 A1 Aug. 14, 2003

(51) Int. Cl.[7] ................................................ G01D 13/02

(52) U.S. Cl. ......................... 116/310; 116/286; 362/23; 362/29

(58) Field of Search ......................... 116/310, 286–288, 116/202, DIG. 5, 62.1, 302, 304; 362/23, 29, 30, 26; 200/314–315

(56) References Cited

U.S. PATENT DOCUMENTS

| | | | | | |
|---|---|---|---|---|---|
| 2,693,165 | A | * | 11/1954 | Appleman | 116/310 |
| 2,699,141 | A | * | 1/1955 | Gaguski | 116/332 |
| 2,831,453 | A | * | 4/1958 | Hardesty | 116/288 |
| 3,074,372 | A | * | 1/1963 | Furey | 116/57 |
| 3,619,594 | A | * | 11/1971 | Morez | 362/140 |
| 4,131,033 | A | * | 12/1978 | Wright et al. | 74/553 |
| 4,549,050 | A | * | 10/1985 | Lang | 200/314 |
| 4,583,151 | A | * | 4/1986 | Nagel | 362/29 |
| 5,093,764 | A | * | 3/1992 | Hasegawa et al. | 362/29 |
| 5,180,050 | A | | 1/1993 | Rada et al. | |
| 5,335,148 | A | * | 8/1994 | Tominaga | 362/26 |
| 6,178,916 | B1 | | 1/2001 | Snider | |
| 6,224,221 | B1 | * | 5/2001 | Glienicke | 362/23 |
| 6,471,648 | B1 | * | 10/2002 | Gamelsky et al. | 600/437 |
| 6,565,223 | B2 | * | 5/2003 | Liao et al. | 362/26 |
| 6,590,174 | B2 | * | 7/2003 | Zysnarski et al. | 200/310 |
| 6,685,327 | B2 | * | 2/2004 | Dorrie | 362/27 |

* cited by examiner

*Primary Examiner*—G. Bradley Bennett
*Assistant Examiner*—Tania Courson
(74) *Attorney, Agent, or Firm*—Stefan V. Chmielewski

(57) ABSTRACT

An indicator knob assembly 10 is provided including a translucent base 26 including an outer surface 14 having an upper portion 22 and a lower portion 24, a halo section 40 located on the lower portion24, an appliqué element 28 mounted on the translucent base 26, and an opaque over mold 30 mounted on the appliqué element 28 and covering a portion of the outer surface 14 not including the halo section 40.

14 Claims, 2 Drawing Sheets

INDICATOR KNOB WITH OVERMOLDED APPLIQUE

TECHNICAL FIELD

The present invention relates generally to an indicator knob with an applique and more particularly to an indicator knob with an applique that utilizes an over mold and appliqué combination to improve the appearance and utility of the knob.

BACKGROUND OF THE INVENTION

Actuators for control devices provide an interface for a variety of mechanisms. Often such actuators must not only enable an operator to access the controls with comfort and ease but must also provide a function indicator that is relative to the actuator's position. In addition, many actuators must be capable of displaying such a function indicator in both daylight as well as low ambient light or nighttime conditions. One known and successful approach to providing such a function indicator is through the use of backlighting. Commonly, a clear or translucent material is utilized for the indicator portion while an opaque material is often used for the actuator body. This allows light, from a position behind the actuator, to travel through the clear or translucent material and illuminate the indicator portion.

The appearance and lighting of an actuator can be important to both functionality and convenience. Often, a high contrast indicator is desirable for daylight conditions. Commonly, this takes the embodiment of a white indicator, although a variety of colors or combinations of colors may be desirable. In low ambient light or nighttime conditions, in addition to backlighting, often a different appearance or coloration is desirable. It is known that this dual appearance function may be provided through a variety of methods. The use of multi-shot injection molding to create a clear indicator portion and an opaque base is one common approach. Filtered lamps or colored plastic filter inserts can be positioned behind the actuator to add the dual coloration functions. Often, however, such approaches may contribute undesirable cost, time, and complexity to the manufacture and assembly of the actuator.

One approach to providing both daytime and nighttime functionality is through the use of an applique. Appliques are thin films applied to the actuators, and a variety of other components, that can be screened with decorations in a variety of colors. The appliques may be affixed to the actuator through a variety of methods. One known technique forms the film to the desired shape and then molds the applique to the material. Another technique, using very thin film, loads the films directly into the molds and the indicator material is injected behind it. Through the use of multi-layer screening and, or screening on two sides, appliques provide a practical and cost effective approach to controlling the appearance of the indicator and providing dual lighting characteristics.

Although the use of appliques is clearly beneficial, their use is not always compatible with applicator production techniques. Commonly when an applique is in-molded, or formed and molded to a base part, there is an objectionable line that is visible around the perimeter where the applique ends. In some actuators, such as pushbuttons, the base of the actuator is often recessed behind a mounting plate, and the objectionable witness lines cannot be seen. In other actuators, however, such as knobs, the actuator must extend out farther from its mountings to provide adequate accessibility. In these circumstances, it is often difficult or impractical to hide the objectionable witness lines. In addition, it is often desirable for actuators, such as knobs, to have a soft touch surface. The soft touch films suitable for use as appliqués are commonly not ultra-violent resistant to color change. Many environments, such as use in automotive components, make the use of materials subject to ultraviolet color change unsuitable. The need to utilize the benefits of applique technology without unsightly witness lines, poor UV resistance, and a lack of a soft touch surface has driven technology to the development of appliqué and soft touch over mold combinations.

The use of soft touch actuators can be highly beneficial. The use of rigid material can make it difficult to match the color and texture of the material surrounding the actuator, as in the case of an automotive dashboard. The use of a soft touch material allows the actuator to blend into the dashboard, making it highly desirable from a styling standpoint. One known approach to combining dual light actuators with soft touch characteristics utilizes a translucent base to form the actuator, an appliqué to provide the dual lighting characteristics, and an opaque soft touch overmold to cover the base, with the exception of the indicator portions. This combination results in a cost effective and functional approach to combining soft touch technology with appliqué lighting benefits.

Although the combination of appliqué lighting with over mold technology has served to improve the actuator appearance and function, there is still room for improvement utilizing these technologies. The illumination of the indicator areas, while clearly indicating the actuators functions in dimly lit conditions, may not adequately illuminate the actuator as a whole. This may require the consumer to engage the perimeter of the actuator in such dim conditions by feel. Although this method of interaction accomplishes the task, it may diminish customer satisfaction and serve to undermine the overall ergonomic feel of the controls. It would be more desirable to illuminate the perimeter of the actuator such that the user could confidently grasp it during nighttime operation.

One approach to illuminating the perimeter of the actuator has been to provide illumination from the surface the actuator is mounted on. To benefit from the discussed appliqué/soft touch over mold technologies, this approach requires that similar techniques be applied to the mounting surface as the actuator itself. These additional manufacturing processes can lead to undesirable increases in the complexity and cost of the overall production. It would be far more beneficial to provide perimeter illumination directly from the actuator itself, and thereby reduce the time, cost, and complexity of the overall assembly.

SUMMARY OF THE INVENTION

It is, therefore, an object of the present invention to provide an indicator knob that combines appliqué technology and soft over mold technology while providing perimeter illumination.

In accordance with the objects of the present invention, an indicator knob is provided. The indicator knob includes a translucent base having an outside surface including an upper portion and a lower portion. An appliqué element is in communication with the outside surface and includes a lower edge. The indicator knob further includes an opaque overmold covering a portion of the applique element such that the lower edge of the appliqué element extends beyond the opaque over mold to provide halo illumination of the indicator knob.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
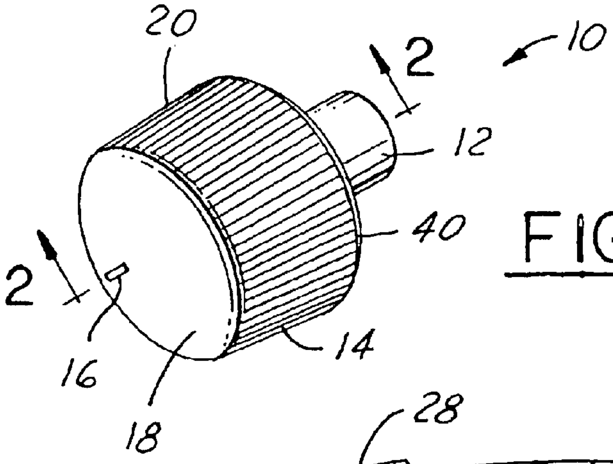
FIG. 1 is an illustration of an embodiment of an indicator knob in accordance with the present invention.

Referring now to FIG. 1 which is an illustration of an indicator knob 10 in accordance with the present invention. Although the indicator knob 10 may be used for a variety of applications, one application contemplates using the indicator knob 10 in automotive electronics applications. The indicator knob 10 includes a base 12 and an outer surface 14. The portion of the outer surface 14 that is used to display the indicator knob 10's position is commonly referred to as the indicator portion 16. Commonly, the outer surface 14 includes a face portion 18 and a side portion 20. It is often highly desirable to have the indicator portion 16 be positioned on both the face surface 18 and side surface 20.

Figure 2:
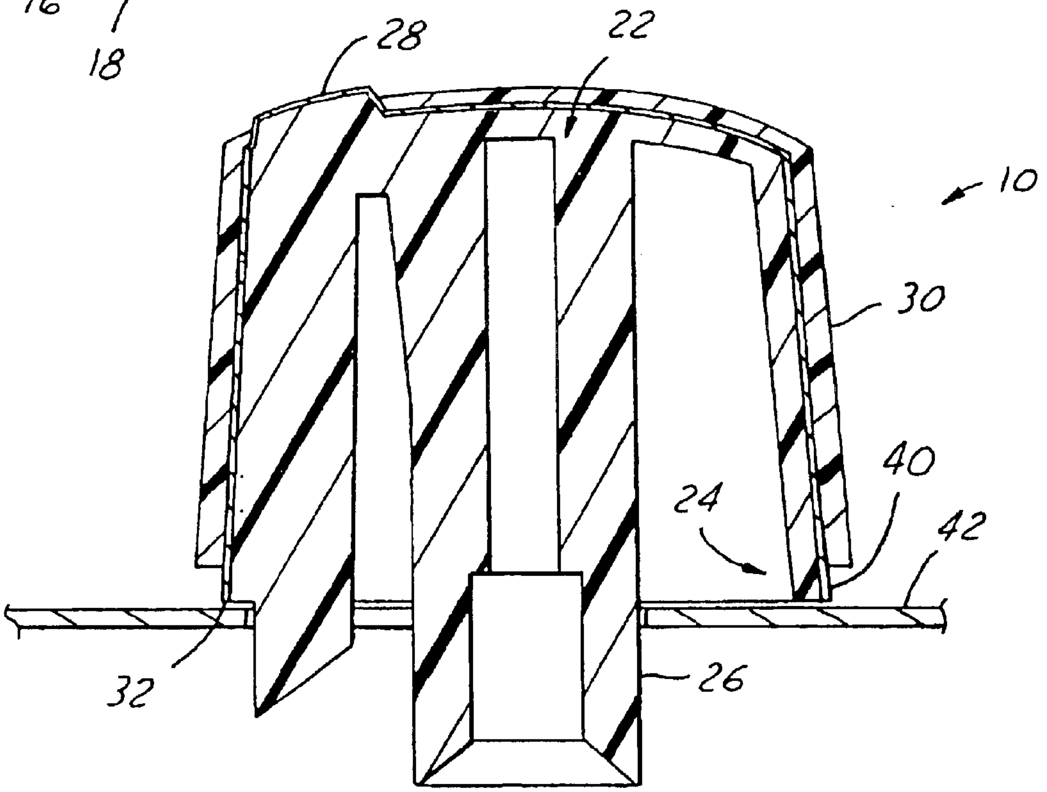
FIG. 2 is a cross-sectional illustration of the indicator knob shown in FIG. 1, the cross section being taken along line 2—2 in the direction of the arrows.

Referring now to FIG. 2, which is a cross-sectional illustration of indicator knob 10 illustrated in FIG. 1. The indicator knob 10 includes a translucent base 26 having an upper portion 22 and a lower portion 24. . The translucent base 26 allows for more efficient and cost effective backlighting of indicator knob 10. In addition, the use of a translucent base 26 eliminates the necessity of a separate component to act as the indicator portion 16. The indicator knob 10 further includes an applique 28 covering the translucent base 26. The use of appliques 28 is known in the prior art. Appliques 28 are commonly used to provide a cost effective and efficient way of providing daytime and low light colorations. Although the use of appliques 28 is known in the prior art, their use has been commonly limited to indicator portions 16. Indicator portions 16 are typically thin, line-like sections that cover two surfaces of the visible area 14, although they may encompass a wide variety of patterns and shapes.

It is also known that an opaque overmold 30 may be used to cover the outer surface 14 of the indicator knob 10 with the exception of the indicator portion 16. The opaque overmold 30 commonly covers the lower edge 32 of the applique 28. The opaque over mold 30 allows for a soft touch surface to be used on the indicator knob 10. In addition, the opaque overmold 30 can be used to secure the appliqué 28 onto the outer surface 14 of the indicator knob 10 even where the indicator portion 16 is thin and wraps over multiple surfaces.

Figure 4:
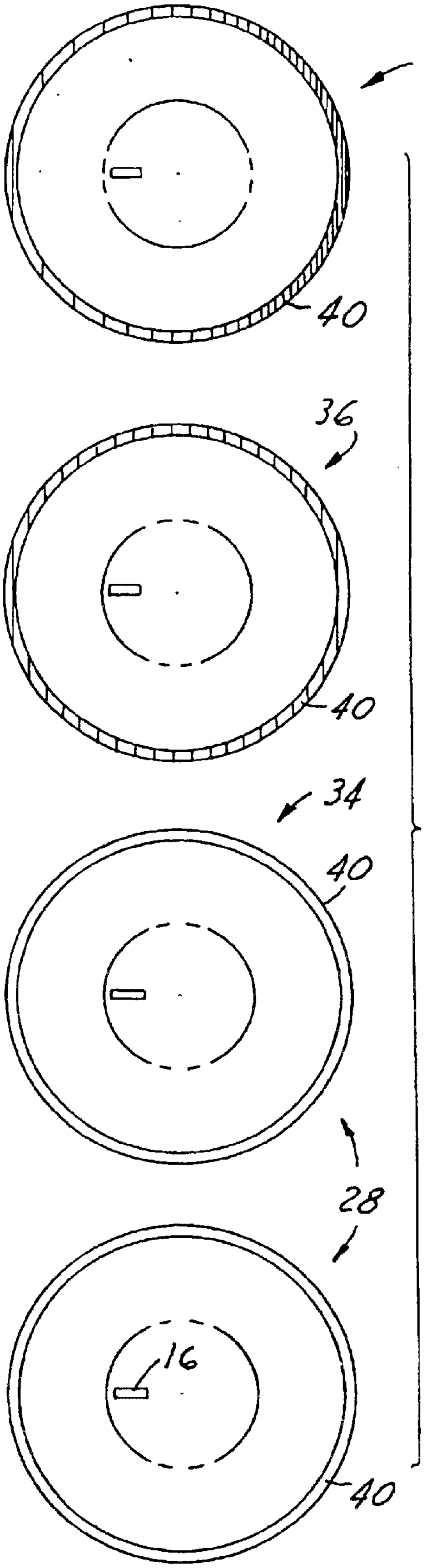
FIG. 4 is an exploded view of an applique for use with an indicator knob in accordance with the present invention.

Referring now to FIG. 4, the use of the applique 28 provides a variety of benefits. The applique 28 may include a daytime screening 34 and a separate low light screening 36. The use of such different screenings allows the indicator portion 16 to have a daytime appearance when light reflects off of the daytime screening 34 and a separate low light coloration when backlighting passes through the low light screening 36. In addition, a screening compensation pass 38 may additionally be applied to the applique 28 to balance out the backlighting coming through the indicator portion 16. This provides a simple and cost effective approach to providing a consistent backlight appearance across the indicator portion 16. In the prior art, this was often a significant concern as the brightness of the indicator portion 16 often varied in relation to distance from the backlight source. The use of the compensation pass 38 allows the backlighting to be adjusted and controlled without regard to backlight source or indicator knob 10 configuration.

Figure 3:
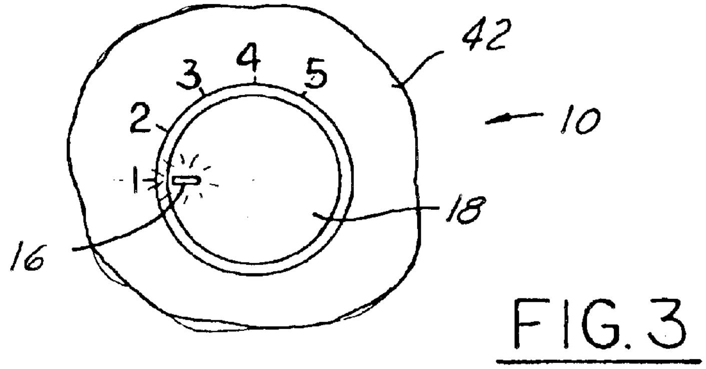
FIG. 3 is a top view of the indicator knob shown in FIG. 1.

The present invention, however, further improves the appearance and utility of the indicator knob 10 by including a halo section 40 (see FIG. 2) positioned on the lower portion 24 of the translucent base 26. The halo section 40 is created by ending the opaque over mold 30 above the lower portion 24 of the translucent base 26. This allows light to emit from the bottom of the indicator knob 10 when it is backlit. By illuminating the bottom of the indicator knob 10 a variety of functions may be achieved. The perimeter of the indicator knob 10 may be emphasized for stylistic reasons during daylight operation. During nighttime operation, the perimeter of the indicator knob 10 may be illuminated to facilitate location of the indicator knob 10 by the user as well as affect the appearance. In addition, by illuminating the bottom of the indicator knob 10, it may be possible to illuminate any marking on the mounting panel 42 (see FIG. 3) close to the indicator knob 10. This feature may eliminate the necessity of independently illuminating the mounting panel and thereby may further increase cost savings.

In one embodiment, the appliqué 28 is extended beyond the opaque over mold 30 to cover the lower portion 24 of the translucent base 26. This allows the halo section 40 to be given the same lighting characteristics previously reserved for the indicator portion 16. This includes daytime screening 34 and a separate low light screening 36. In addition, the screening compensation pass 38 may be applied to the appliqué 28 to balance out the backlighting coming through the halo section 40. In this fashion, the indicator knob 10 may be endowed with improved appearance, utility and design control. In addition, it is possible for cost savings to be realized within the mounting panel 42.

While particular embodiments of the invention have been shown and described, numerous variations and alternative embodiments will occur to those skilled in the art. Accordingly, it is intended that the invention be limited only in terms of the appended claims.

What is claimed is:

1. An indicator knob assembly adapted to cooperate with a light source to indicate the position of the knob, said knob assembly comprising:

- a translucent base including an outer surface having an upper portion and a lower portion, said base defining a translucent halo section on said lower portion of said outer surface for emitting light from the base for illumination;
- an appliqué element directly mounted on said translucent base; and
- an opaque over mold directly mounted on said appliqué element and covering a portion of said outer surface not including said halo section.

2. An indicator knob assembly as described in claim 1 wherein said appliqué element extends to cover said halo section.

3. An indicator knob assembly as described in claim 1 wherein said opaque over mold includes a soft touch surface.

4. An indicator knob assembly as described in claim 1 wherein said appliqué element includes a daytime screening.

5. An indicator knob assembly as described in claim 1 wherein said appliqué element includes a lowlight screening.

6. An indicator knob assembly as described in claim 1 further comprising:

a mounting panel adapted to be mounted over the light source, said lower portion of said base positioned adjacent said mounting panel;

wherein said halo section illuminates at least a portion of said mounting panel when said mounting panel is mounted over the light source.

7. An indicator knob assembly adapted for use with a light source, said indicator knob assembly comprising:

a base including an upper portion and a lower portion, said base defining a translucent halo section located on said lower portion for emitting light from the base for illumination;

an appliqué element directly mounted on said base and covering said halo section; and an opaque over mold directly mounted on said appliqué element and covering a portion of said upper and lower portions not including said halo section.

8. An indicator knob assembly as described in claim 7 wherein said opaque over mold includes a soft touch surface.

9. An indicator knob assembly as described in claim 7 wherein said appliqué element includes daytime screening.

10. An indicator knob assembly as described in claim 7 wherein said appliqué element includes a lowlight screening.

11. An indicator knob assembly as described in claim 7 further comprising:

a mounting panel adapted to be mounted in front of the light source, said halo section of said base positioned adjacent said mounting panel;

wherein when said halo section emits light from the light source such that said halo section illuminates at least a portion of said mounting panel.

12. A method of displaying the position of an indicator knob comprising the steps of:

transmitting light through a translucent base of the indicator knob;

directly mounting an appliqué element on said translucent base;

preventing light from emitting from an upper portion of the translucent base by covering the upper portion of the base and the appliqué element with an opaque over mold; and permitting light to emit from the base by defining a halo section in a lower portion of the translucent base not included in the covered portion of the base.

13. The method of claim 12 further comprising the step of:

screening the light emitted from the halo section by covering the halo section with the appliqué element.

14. The method of claim 12 further comprising the step of:

illuminating a portion of a mounting panel by positioning the halo section adjacent the mounting panel.

* * * * *